US010701424B2

(12) United States Patent
Martell (10) Patent No.: US 10,701,424 B2
(45) Date of Patent: Jun. 30, 2020

(54) SYSTEMS AND METHODS OF MANAGING VIDEO AND AD SEGMENTS IN A LIVE STREAM

(71) Applicant: Martell Broadcasting Systems, Inc., Brooklyn, NY (US)

(72) Inventor: Carey Ray Martell, San Marcos, TX (US)

(73) Assignee: Martell Broadcasting Systems, Inc., Brooklyn, NY (US)

( * ) Notice: Subject to any disclaimer, the term of this patent is extended or adjusted under 35 U.S.C. 154(b) by 0 days.

(21) Appl. No.: 16/152,299

(22) Filed: Oct. 4, 2018

(65) Prior Publication Data

US 2019/0246158 A1 Aug. 8, 2019

Related U.S. Application Data

(63) Continuation-in-part of application No. 15/887,940, filed on Feb. 2, 2018.

(51) Int. Cl.
| | |
|---|---|
| *H04N 7/10* | (2006.01) |
| *H04N 7/025* | (2006.01) |
| *H04N 21/262* | (2011.01) |
| *H04N 21/845* | (2011.01) |
| *H04N 21/81* | (2011.01) |
| *H04N 21/234* | (2011.01) |

(52) U.S. Cl.
CPC . *H04N 21/26233* (2013.01); *H04N 21/23424* (2013.01); *H04N 21/812* (2013.01); *H04N 21/8456* (2013.01)

(58) Field of Classification Search
None
See application file for complete search history.

(56) References Cited

U.S. PATENT DOCUMENTS

| | | | |
|---|---|---|---|
| 6,157,814 A * | 12/2000 | Hymel | G08B 5/229 |
| | | | 340/7.48 |
| 8,521,899 B2 | 8/2013 | Narula | |
| 2003/0093790 A1* | 5/2003 | Logan | G10H 1/0033 |
| | | | 725/38 |
| 2003/0163832 A1* | 8/2003 | Tsuria | H04N 5/76 |
| | | | 725/135 |

(Continued)

*Primary Examiner* — William J Kim
(74) *Attorney, Agent, or Firm* — Lynch LLP (57) ABSTRACT

Systems and methods of managing online streaming content are contemplated in this application. A new data structure is discussed. The new data structure is useful for the organization and delivery of streaming content—especially live content. Systems and methods make it possible for a broadcast manager to determine when advertisements can be played during a live broadcast (e.g., during a time out in a basketball game). Episode containers (the new data structure) include different segments, including both video-segments and advertisement-segments, where segments can be used to broadcast video from different sources. This can be particularly useful for broadcasting of content online where advertisement videos can be hosted elsewhere from where the broadcast content is hosted, allowing users to seamlessly watch a program with advertisements without experiencing interruption when they are transitioned to an advertisement from the broadcast.

16 Claims, 3 Drawing Sheets

(56) References Cited

U.S. PATENT DOCUMENTS

| | | | |
|---|---|---|---|
| 2005/0005308 A1* | 1/2005 | Logan | G06Q 30/06 |
| | | | 725/135 |
| 2006/0085360 A1* | 4/2006 | Grim, III | G06Q 20/3674 |
| | | | 705/67 |
| 2009/0228920 A1 | 9/2009 | Tom | |
| 2009/0328095 A1* | 12/2009 | Vinokurov | H04H 20/10 |
| | | | 725/32 |
| 2013/0282915 A1* | 10/2013 | Patel | H04L 65/60 |
| | | | 709/231 |
| 2014/0279032 A1* | 9/2014 | Roever | G06Q 30/0267 |
| | | | 705/14.64 |
| 2015/0213502 A1* | 7/2015 | Minter | G06Q 30/0267 |
| | | | 705/14.64 |

\* cited by examiner

SYSTEMS AND METHODS OF MANAGING VIDEO AND AD SEGMENTS IN A LIVE STREAM

This application claims priority to U.S. patent application Ser. No. 15/887940, filed on Feb. 2, 2018, and which is incorporated to this application by reference.

FIELD OF THE INVENTION

The field of the invention is online content broadcasting and data structures to facilitate the same.

BACKGROUND

The background description includes information that may be useful in understanding the present invention. It is not an admission that any of the information provided in this application is prior art or relevant to the presently claimed invention, or that any publication specifically or implicitly referenced is prior art.

Broadcasting content, live or otherwise, is not new. But as Internet-based systems and services continue to develop, new needs arise that drive new innovation. For example, as more and more people move away from traditional television with cable subscriptions, they are increasingly switching to streaming services. And while streaming services began by facilitating access to on-demand, pre-recorded content, live content has become more widely available online in recent years.

With the ability to stream live content, there arose a need to develop new ways to handle that content from a content distributor's perspective. For example, during a live broadcast of a sporting event, commercial breaks must be added in strategically to coincide with events in the sporting event (e.g., during a timeout). To determine when a commercial break should be added, it can help to have a human operator determining when those breaks should be inserted into a live stream.

Online live streams are different from traditional live streams at least because the content for advertisements and the live broadcasting content in an online stream often come from different sources. Because a broadcast must change from one video source to another when switching from content to advertisement, there is a need for new innovation that facilitates seamless switching between different video streams so that viewers experience no interruption in their viewing experience.

One way to facilitate handling of live content with advertisements is to create a new data structure that makes it easy to add commercial breaks—regardless of the source of the advertisement stream—and to create easily re-broadcastable content once a live broadcast has concluded.

Thus, there is still a need in the art for improved systems and methods of managing online broadcasts that feature advertisements, especially when advertisement timing is unknown at the outset of a broadcast such as in a live broadcast.

SUMMARY OF THE INVENTION

The present invention provides apparatus, systems, and methods in which online broadcasts can be managed and with which episodes can be created to have advertisement space.

In one aspect of the inventive subject matter, a system for broadcasting video with advertisements is contemplated. The system includes a server that is configured to carry out several functions, including: begin a live broadcast using an episode container comprising a first video-segment; receive an advertisement interruption request during the live broadcast; in response to the advertisement interruption request identify at least one advertisement and add at least one advertisement-segment to the episode container, the at least one advertisement-segment having an advertisement-segment duration; switch from the first video-segment to the at least one advertisement-segment to play the at least one advertisement; add a second video-segment to the episode container; and switch from the at least one advertisement-segment to the second video-segment to continue the live broadcast.

In some embodiments, the advertisement interruption request is initiated by a broadcast operator (e.g., a human operator or an AI operator). In some embodiments, a duration for the at least one advertisement is less than or equal to the advertisement-segment duration.

It is contemplated that the server can be further configured to save, for later rebroadcast, the episode container comprising the first video-segment, the second video-segment, and the at least one advertisement-segment. Upon rebroadcast, the server can be configured to identify a new advertisement to be played in the at last one advertisement-segment.

In some embodiments, the episode container can be sent to the server by the broadcast operator, while in other embodiments, the episode container is created within the server (e.g., by the broadcast operator). The advertisement-segment can comprise an advertisement-segment start time that is measured relative to the live broadcast start time.

In some embodiments, the server is further configured to use the episode container to rebroadcast the contents of the episode container. It is contemplated that the at least one advertisement-segment can include a first advertisement-segment and a second advertisement-segment.

The server can also be further configured to: identify a new advertisement having a new advertisement duration that is less than or equal to the advertisement-segment duration; insert the new advertisement into the at least one advertisement slot in the episode container; and rebroadcast the episode from the completed episode container using a new advertisement in the at least one advertisement slot.

In another aspect of the inventive subject matter, a method for broadcasting video with advertisements is contemplated. Such methods include the steps of: beginning a live broadcast using an episode container comprising a first video-segment; receiving an advertisement interruption request during the live broadcast; in response to the advertisement interruption request, identifying at least one advertisement and adding at least one advertisement-segment to the episode container, the at least one advertisement-segment having an advertisement-segment duration; switching from the first video-segment to the at least one advertisement-segment to play the at least one advertisement; adding a second video-segment to the episode container; and switching from the at least one advertisement-segment to the second video-segment to continue the live broadcast.

In some embodiments, the advertisement interruption request is initiated by a broadcast operator. In some embodiments, a duration for the at least one advertisement is less than or equal to the advertisement duration.

Some methods of the inventive subject matter further include the step of saving, for later rebroadcast, the episode container comprising the first video-segment, the second video-segment, and the at least one advertisement-segment.

It is contemplated that some methods can include the step of, upon rebroadcast, identifying a new advertisement to be played in the at last one advertisement-segment.

In some embodiments, methods include the step of receiving the episode container from a broadcast operator. In some embodiments, methods include the step of using the episode container to rebroadcast the contents of the episode container. It is contemplated that the at least one advertisement-segment can include a first advertisement-segment and a second advertisement-segment.

In some embodiments, methods further include the steps of: identifying a new advertisement having a new advertisement duration that is less than or equal to the advertisement slot duration; inserting the new advertisement into the at least one advertisement slot in the episode container; and rebroadcasting the episode from the completed episode container using a new advertisement in the at least one advertisement slot.

One should appreciate that the disclosed subject matter provides many advantageous technical effects including a new data structure for online streaming content with advertisement breaks. This new data structure facilitates advertisement interruption especially during live broadcasts, and it is also useful for re-broadcasting of content.

Various objects, features, aspects and advantages of the inventive subject matter will become more apparent from the following detailed description of preferred embodiments, along with the accompanying drawing figures in which like numerals represent like components.

DETAILED DESCRIPTION

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used in the description in this application and throughout the claims that follow, the meaning of "a," "an," and "the" includes plural reference unless the context clearly dictates otherwise. Also, as used in the description in this application, the meaning of "in" includes "in" and "on" unless the context clearly dictates otherwise.

Also, as used in this application, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements. Moreover, and unless the context dictates the contrary, all ranges set forth in this application should be interpreted as being inclusive of their endpoints and open-ended ranges should be interpreted to include only commercially practical values. Similarly, all lists of values should be considered as inclusive of intermediate values unless the context indicates the contrary.

It should be noted that any language directed to a computer should be read to include any suitable combination of computing devices, including servers, interfaces, systems, databases, agents, peers, Engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. The following description includes information that may be useful in understanding the present invention. It is not an admission that any of the information provided in this application is prior art or relevant to the presently claimed invention, or that any publication specifically or implicitly referenced is prior art.

Embodiments of the inventive subject matter are directed to systems and methods of conducting a live, online broadcast of video content. Live broadcasts need to be capable of inserting advertisement breaks, and there exists a need for systems and methods that both facilitate the insertion of advertisement breaks in an online, live video stream and also to facilitate re-broadcast of a formerly live broadcast where the advertisements shown in subsequent re-broadcasts can be the same or different from the original advertisements.

Figure 1:
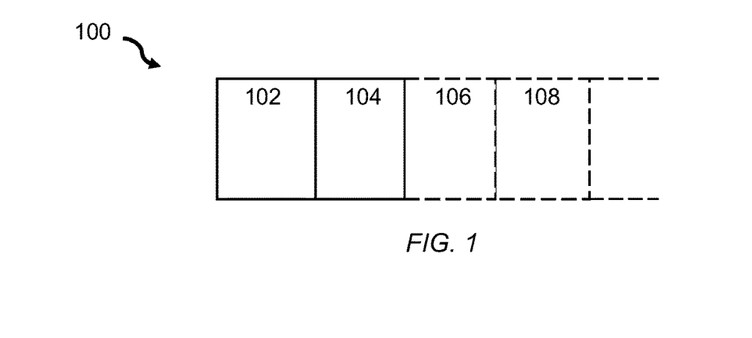
FIG. 1 shows an example episode container.

To make this possible, episode containers are used. An episode container is a data structure that includes one or more segments, as shown in FIG. 1. Each segment can be used to show video of any kind, whether it is an advertisement or a video segment of a television show that is being broadcast live. The episode container 100 in FIG. 1 shows a first video-segment 102 and a first advertisement-segment 104, along with dotted lines showing a second video-segment 106 and a second advertisement-segment 108. The second video-segment 106 and second advertisement-segment 108 are shown in dotted lines for several reasons.

A "segment" in this application refers to a slot in an episode container that can be used to broadcast video (e.g., video is broadcast in a video-segment). The segment itself is not necessarily a video, and instead it is capable of accommodating video by facilitating playback of that video and organizing videos into an episode. Although many of the embodiments described herein refer to live video, it is contemplated that segments in an episode container can be used to broadcast either live or pre-recorded video.

Episode containers of the inventive subject matter facilitate creation of re-broadcastable episodes having advertisement space (i.e., advertisement-segments). An episode container can be created in whole or in part before a broadcast begins. For example, if a soccer game is to be broadcast live, then it is known before the game begins that there will be a halftime, during which advertisements can be shown to viewers at home. Thus, a soccer game would include a first video-segment for the first half of the soccer game, followed by a plurality of advertisement-segments for the halftime advertisements, followed again by a second video-segment for the second half of the soccer game. The plurality of advertisement-segments can include one or more different advertisement-segments. In some embodiments, the number of advertisement-segments is determined at the time the episode container is created, while in other embodiments, the number of advertisement-segments can be determined on-the-fly and based at least in part on how long the halftime is.

In embodiments where advertisement information is unknown at the start of a broadcast, episode containers can instead by built on-the-fly by, for example, a broadcast manager, by using the invention. A broadcast manager is a person that has access to the backend of a system of the inventive subject matter (e.g., access to server via direct or remote connection). When a broadcast begins, the broadcast manager can decide when an advertisement should be added into the episode container. For example, if a basketball game is being broadcast, the broadcast manager can initiate an advertisement when a timeout is called.

In some embodiments, when a broadcast manager initiates an advertisement, they must specify the length for the advertisement break. For example, a broadcast manager can initiate an advertisement break, specifying that the break will last for 45 seconds. This action causes the creation of at least one advertisement-segment in the episode container. In some embodiments, the advertisement duration specified by the broadcast manager can be divided into several advertisement-segments. For example, a 45 second ad break can be broken into three 15 second advertisements, one 30 second advertisement and one 15 second advertisement, or any other division where the sum of the durations is 45 seconds.

Figure 5:
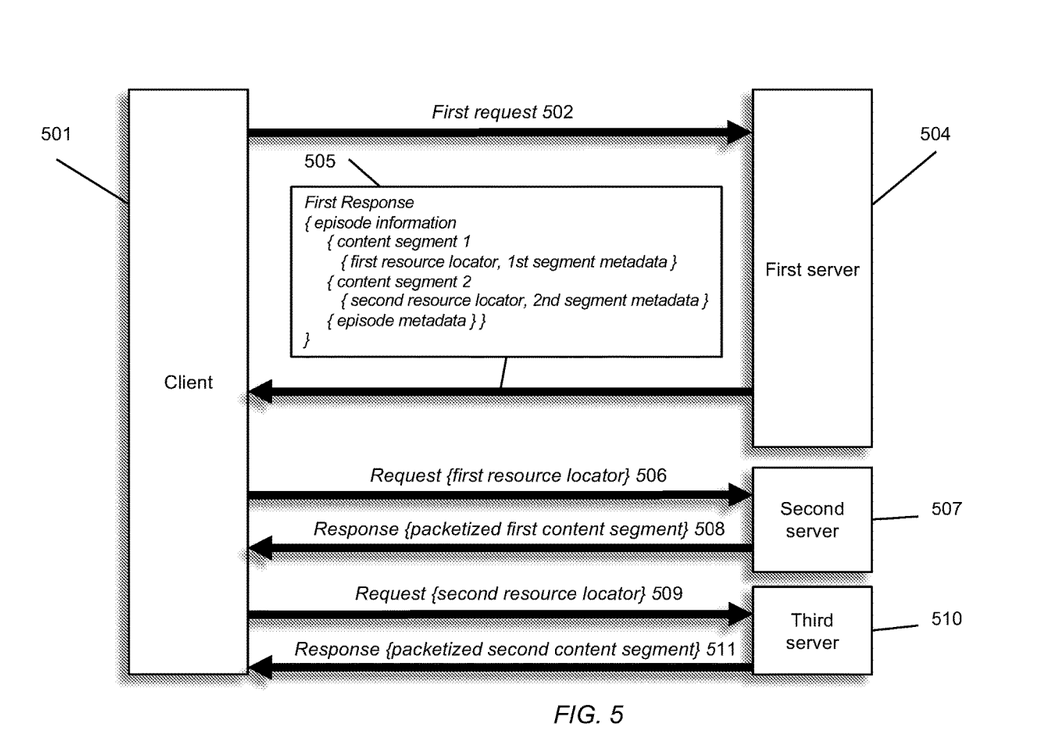
FIG. 5 depicts a process of client/server communication according to the invention.

Once an episode container is created (either partially or entirely), it can be used to facilitate consumer access to broadcasted online content. Each segment of an episode container, as described in this application, can be used to playback video or advertising content. FIG. 5 depicts an embodiment of a method by which a client computing device 501 can retrieve video and associated information from one or more servers (e.g., servers 504, 507, and 510) according to an episode container. The method in FIG. 5—and portions thereof, as needed—can be incorporated into any other method of the inventive subject matter described in this application. Client computing device 501 sends a first request 502 comprising an episode identifier to a first server 504. The episode identifier corresponds to an episode container that is configured to broadcast video content using its various segments—this first request asks the server for information related to the episode container that the client needs. First server 504 responds to the first request 502 with a first response 505, which includes episode information according to the episode identifier. Episode information comprises a list of content portions (e.g., portions of video content that: can be created from a larger video by breaking it into smaller segments; are stand-alone videos; and are advertisements) together with episode metadata, where each content portion exists within the episode container associated with the episode identifier, and each content portion can be broadcast in a segment of the episode container.

According to the invention, the list of content portions corresponding to the episode container may have content portion metadata associated with each content portion in the list. Content portion metadata comprises a selection of one or more of content portion length, format, quality, title, and may also comprise other similar information. Other embodiments are also possible, where content portion metadata is transmitted with episode metadata (e.g., metadata associated with an episode that can be broadcast using an episode container). In some embodiments, episode metadata comprises an episode length. According to the invention, at least one content portion in the list of content portions corresponds to an advertisement that can be played in an advertisement-segment. It is also contemplated that the list of content portions can be incomplete when, for example, a live broadcast is occurring in the video-segments of the episode container and the number of advertisement-segments is therefore unknown.

At appropriate times after a first response 505 is received from first server 504, such as when a user begins watching an episode or the content controller begins to broadcast content associated with a first content segment (e.g., a video-segment or an advertisement-segment), client computing device 501 next sends a second request 506 that requests data corresponding to a first resource locator from second server 507. In response, second server 507 (e.g., a server holding video information to be delivered to a client computer for playback) delivers a second response 508 comprising a packetized first content portion that corresponds to packetized digital video data and is associated with the content segment to be played at that time. In some embodiments, the packetized digital video data of a segment corresponds to a live stream. At another appropriate time, such as when the content controller is directed by an episode container to begin broadcasting video associated with a second video segment, client computing device 501 sends a third request 509 comprising second resource locator to third server 510. In response, third server 507 sends a third response 511 that comprises a packetized second content portion associated with the second video segment in the episode container. In some embodiments, the second content portion is an advertisement that is associated with an advertisement-segment.

Figure 6:
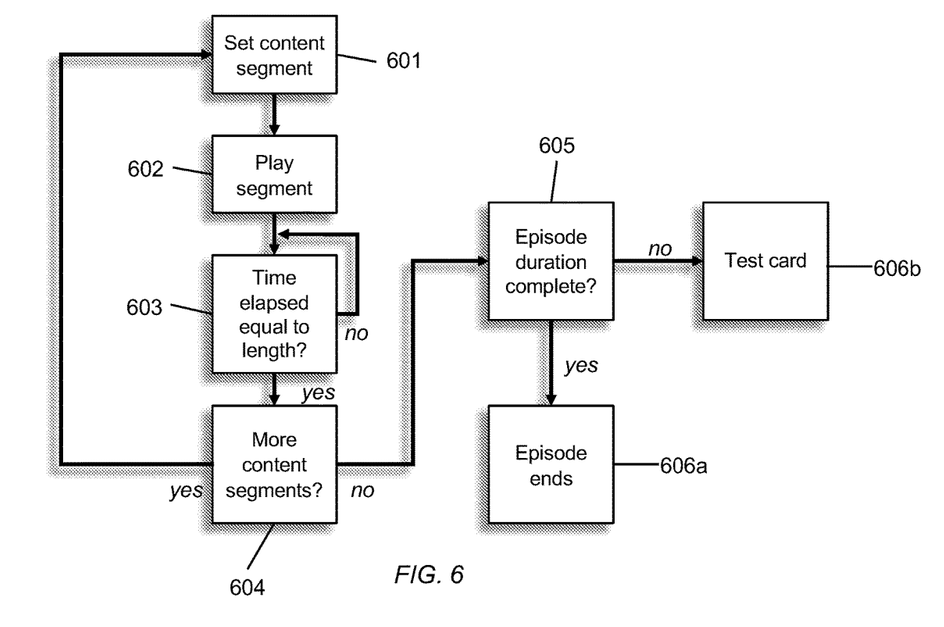
FIG. 6 depicts a client episode playback process according to the invention.

FIG. 6 depicts a process flow chart for a content controller used in playing an episode from an episode container. At step 601, the content controller sets the content portion. In one aspect of the invention, in which episodes play in "current time," step 601 also comprises the step of determining a segment that corresponds with the current time. At step 602, the content controller instructs the content player to play the currently set content in a segment of an episode container. In a "current time" aspect of the invention, step 602 also comprises the step of determining an offset of a content portion based on the current time. At step 603, content controller determines whether the time elapsed is equivalent to the content portion length (e.g., is the amount of time that has elapsed since the scheduled start of a video- or advertisement-segment greater than or equal to the duration of a video or advertisement that is being or has been played back in the corresponding segment?).

In "current time" aspects of the invention, step 603 further comprises determining an equivalent time elapsed based on the time elapsed since an episode began playing and an episode offset as determined in step 602. In some aspects of the invention, the content controller may rely on a message from the content player than a content portion has finished playing (e.g., it is time to switch to a different segment in an episode container), thereby triggering the determination of step 602. If the time elapsed is evaluated to be equal to the length in step 603, content controller determines at step 604 whether more segments exist in the episode container (e.g., in the list of content portions). If yes, content controller returns to step 601. If no, content controller progresses to step 605, in which the content controller determines, based on an elapsed time and an episode length from episode metadata received as shown in and described by reference to FIG. 5, whether the episode has finished. If the episode has finished, content controller progresses to step 606a, executing a sequence of instructions associated with an episode ending. If the episode has not finished based on the calculation in step 605, e.g., because a user skipped advertisements associated with the episode, content controller progresses to step 606b and instructs content player execute instructions associated with the end of an episode, depicted in 606b as playing a test card. This sequence also creates an undesirable viewing quality if a viewer attempts to circumvent viewing advertisements.

In embodiments where the total advertisement time is broken into different advertisement slots, each of those advertisement slots is given a corresponding advertisement-segment in an episode container. For example, in FIG. 1, a first video-segment 102 is followed by a first advertisement-segment 104, but that first advertisement-segment can be followed by a second advertisement-segment instead of by a second video-segment 106 (e.g., segment 106 is an advertisement-segment instead of a video-segment). Thus, after one advertisement-segment is used to broadcast an advertisement, the episode container can either switch back to a video-segment (e.g., to continue a live broadcast or to return to scheduled programming).

In some embodiments, only a single video-segment and single advertisement-segment are included in an episode container (e.g., only segments 102 and 104, as shown in FIG. 1). For example, if a video-segment is used to play a short video, then the episode container can include a single video-segment that can be followed by a single advertisement-segment for an advertisement. But episode containers can include any number of video-segments and advertisement-segments, in any order or combination. A limit to the number of segments in an episode container depends on the length of time of a broadcast and how many advertisement-segments a broadcast operator elects to put into that broadcast.

Thus, episode containers can be entirely pre-built, partially pre-built, or built/added to on-the-fly as video content is broadcasted, facilitating re-broadcasting of video content with built-in commercial breaks. In some embodiments, a re-broadcast can show different advertisements than were originally shown, where each advertisement-segment is used to show an advertisement that meets certain criteria (e.g., an appropriate advertisement length for an advertisement-segment, a correct target audience, etc.).

Figure 2:
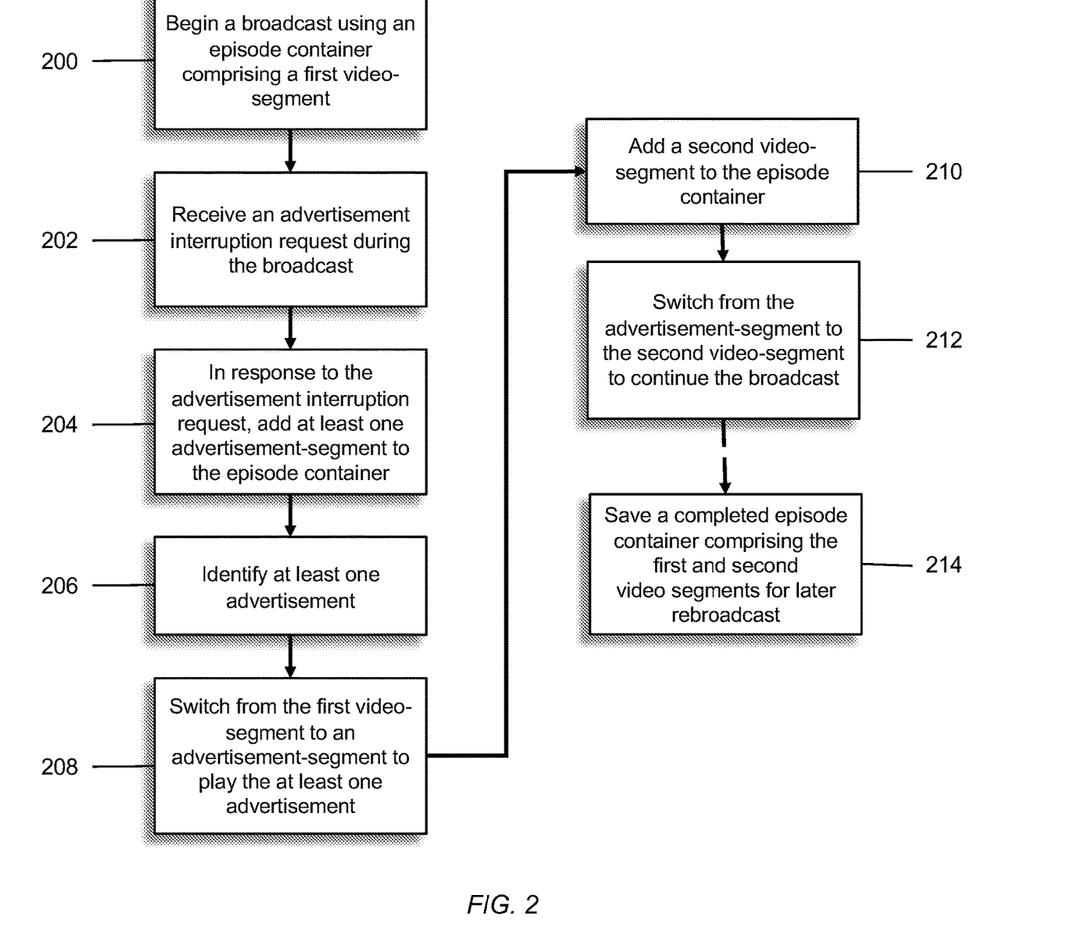
FIG. 2 shows a flowchart of a live broadcast with advertisement breaks.

FIG. 2 shows a flowchart of how systems and methods of the inventive subject matter can function. To begin, a broadcast must be initiated per step 200. The broadcast (e.g., a live broadcast or otherwise) can be initiated by, for example, a broadcast manager (e.g., a person, entity, or computer-controlled system), or it can be pre-scheduled to begin at a particular time such that the broadcast is automatically initiated at a desired time.

To begin a broadcast, an episode container can first be created with at least one video-segment. In some embodiments, the episode container is created at the time the broadcast is initiated, while in other embodiments, the episode container is created beforehand and then put into use when the broadcast begins. The first video-segment in an episode container is then used to begin broadcasting desired content (e.g., live or pre-recorded content). In some embodiments, as discussed above, the episode container starts with only a single video-segment and additional segments are added on an as-needed basis. In some embodiments, an episode container is completely created before-hand to include both video-segments and advertisement-segments, and no additional segments are added throughout a broadcast.

Once a broadcast has begun, advertisements can be played or introduced at certain times. In some embodiments, as is shown in step 202 of FIG. 2, a server of the inventive subject matter receives an advertisement interruption request during the broadcast. An advertisement interruption request can be initiated by, for example, a broadcast manager. A broadcast manager can monitor a broadcast in an effort to identify proper times to insert advertisements, and, in some embodiments, to determine how long an advertisement break should last for.

Taking again an example of a basketball game, a broadcast manager could initiate an advertisement interruption request when a timeout is called. The advertisement interruption request is received by a server that, in response, creates an advertisement-segment and identifies an advertisement that is suitable for broadcast in that advertisement-segment, as shown in steps 204 and 206. Although these steps are shown as occurring in order in FIG. 2, it is contemplated that as soon as the interruption request is received, an advertisement-segment can be added and an advertisement can be identified in parallel. As with all methods described in this application, many steps can occur in different orders than they are shown in, and they are shown in a particular order for demonstrative purposes only.

Several criteria can make an advertisement suitable for broadcast within an advertisement-segment. For example, in some embodiments, the advertisement interruption request has a maximum advertisement duration associated with it, and only advertisements with durations that are less than or equal to the maximum advertisement duration can be broadcast in that advertisement-segment. In some embodiments, advertisements can also be selected for broadcast in an advertisement-segment based on the type of content played in the video-segments (e.g., an advertisement for sports equipment can be played during broadcast of a sport), the audience (e.g., an advertisement for feminine hygiene products can be played during broadcast of a show with a large female audience), and so on.

Next, the server switches from the current video segment to the newly added advertisement-segment so that an identified advertisement can be broadcast as shown in step 208. The effect from a consumer's perspective is that the program they are watching goes to commercial break. From the broadcast manager's perspective, they have requested an advertisement break where advertisements can be played for duration amount of time. This causes one or more advertisement-segment to be added to the episode container, depending on how many advertisements are to be played during the break. As mentioned above, the sum of the durations of time for each of the advertisement-segments that are added to the episode container is equal to the advertisement break duration that can be identified by a broadcast manager.

In some embodiments, the broadcast manager can initiate an advertisement interruption request that allows the system to add one or more advertisement-segments on an as-needed basis until the broadcast manager indicates that the advertisement break must end. Each of the as-needed advertisement-segments can have a default duration (e.g., 15 seconds, 30 seconds, 45 seconds, or any other duration suitable for an advertisement), and each subsequently-added advertisement-segment can have the same or a different duration. It is contemplated that when the broadcast manager indicates that the advertisement break is over, an advertisement can either be allowed to finish or it can be cut short to immediately return to a video-segment (e.g., return to the regularly scheduled content).

In some embodiments, one advertisement-segment can accommodate multiple advertisements. In such embodiments, each advertisement-segment is used to broadcast multiple advertisements that, for example, originate from a single source, thus obviating a need for multiple advertisement-segments. Segments can be useful when different sources are used for different videos or advertisements, but when a series of advertisements are broadcast from a single source, there may not be a need to switch between difference sources, and thus no need to switch between different segments. For example, an advertisement video can comprise one or more separate advertisements that are strung together into a single video. In such instances, a single advertisement-segment is sufficient to broadcast a composite advertisement video. When an advertisement break concludes—either by a total amount of time lapsed that has been allotted for an advertisement segment or by a request from a broadcast manager to conclude an advertisement-segment—an advertisement video can either be truncated to conclude at a particular time whether it has finished playing or not, or an advertisement video can be allowed to finish playing before concluding.

There are several conditions under which a second video-segment can be added to an episode container. Although step 210 describes adding a second video-segment in a certain order relative to other steps or actions, it is contemplated that a second video-segment can be added at a variety of different times. In some embodiments, a second video-segment is added after a broadcast operator indicates that advertisements should be concluded so that a broadcast can continue. To continue the broadcast, a second video-segment is added to the episode container.

In some embodiments, a second video-segment can be added at the same time that the first advertisement-segment is added to the episode container. In such embodiments, the broadcast operator can indicate, for example, a total amount of time for advertisements or a total number of advertisements to be shown with foreknowledge that the content that is being broadcast in a first video-segment will need to continue after one or more advertisements are broadcast. Thus, a second video-segment can be added to the container at the same time as one or more advertisement-segments are added. If, on the other hand, it is known that the content broadcast in a first video-segment will conclude, then there is no need for a second video-segment.

After playing advertisements in the one or more advertisement-segments, a video stream can switch again from broadcasting video content in the one or more advertisement-segments to broadcasting content in a second video-segment, as shown in step 212. By this point, the episode container can include at least a first video-segment, one or more advertisement-segments, and a second video-segment. The episode container—at any time, but preferably at the conclusion of a broadcast—can then be saved for later re-broadcast, as shown in step 214. This step is denoted in FIG. 2 with dotted lines because it is considered optional. One purpose of creating episode containers is to implement a new data structure to contain episodes that facilitates re-broadcast of content that was, for example, broadcast by live-stream, with advertisement segments added on the fly. Although live broadcasts with advertisements have been done before, there nevertheless exists a need to improve the process for live-streams over the Internet. One major difference between traditional live broadcasts and online-streaming live broadcasts, for example, is that advertisements and video content can come from completely different sources, thus necessitating an ability to seamlessly switch between different video sources. By creating different segments in an episode container, switching between different sources is simplified. Each segment can accommodate a different video source, which would not be necessary using traditional broadcasting techniques. Thus, creating an episode container makes it vastly easier to both broadcast video content online (either live or pre-recorded), and in the instance of live broadcasts, episode containers of the inventive subject matter facilitate re-broadcast.

Figure 3:
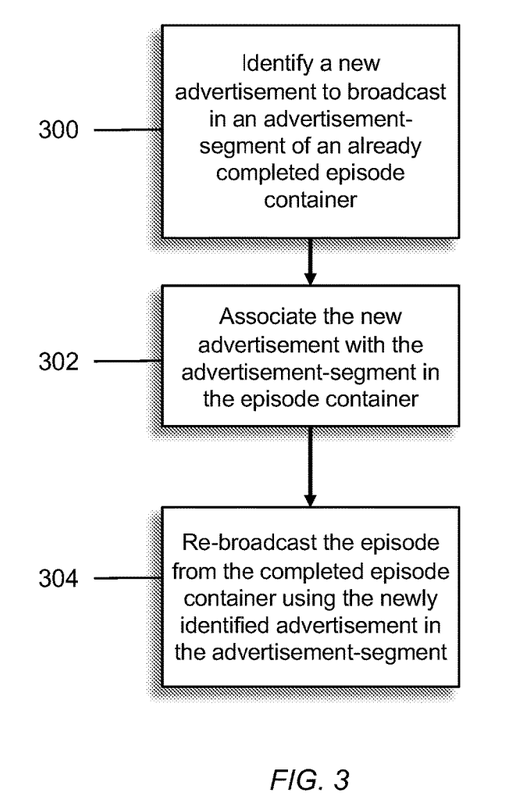
FIG. 3 shows a flowchart of a re-broadcast with at least one newly identified advertisement.

Because episode containers include segments that are capable of broadcasting any video from any source, it is contemplated that, upon re-broadcast, different advertisements can be identified for the advertisement segments in an already-completed episode container. This is shown in FIG. 3. In step 300, a new advertisement is identified. That new advertisement can be played in an advertisement slot of an already completed episode container. Identifying the new advertisement can be handled in the same manner as identifying the original advertisement. In embodiments where advertisement-segments have an associated advertisement duration, the new advertisement must have a duration that is less than or equal to the associated advertisement duration to ensure that the advertisement will not be cut short.

Episode containers that allow for new advertisements to be identified upon re-broadcast have several advantages over old techniques. For example, episode containers can facilitate targeted advertising. If an episode is re-broadcast at a different timeslot than it was originally aired in, new advertisements can be identified based on the anticipated audience. Episode containers can also make it easier to re-broadcast content by giving broadcast operators a convenient data structure to store episodes in for later use. Thus, to start a re-broadcast, a completed episode container need only be identified and set to begin at a desired time. Because upon first broadcast, advertisement breaks were already identified causing the addition of advertisement-segments to the episode container, re-broadcast is made dramatically simpler by obviating the need for a broadcast operator to identify commercial breaks.

Once a new advertisement has been identified, it can be associated with an existing advertisement segment from a completed episode container, as shown in step 302. Because episode containers, upon completion, can be used to playback an episode with different advertisements than were originally aired, only the video-segments already have video content associated with them, and the advertisement-segments can have new content associated with them. Thus, newly identified advertisements can be associated with advertisement-segments in a completed episode container.

Although as shown in FIG. 3 the final step 304 is to re-broadcast an episode using a completed episode container with newly identified advertisements, the step of beginning a re-broadcast can begin at any time so long as steps 300 and 302 occur with sufficient time for an advertisement-segment to be switched to so that a newly identified advertisement can be broadcast via that advertisement-segment.

Figure 4:
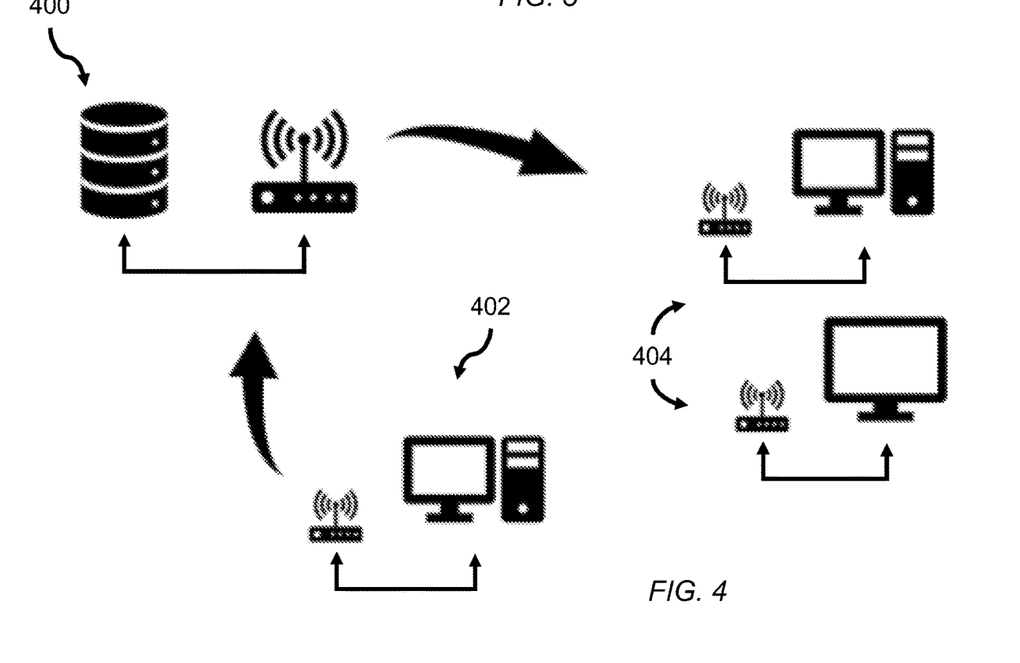
FIG. 4 shows interactions between a broadcast manager, a server or servers, and clients.

Many of the interactions described in this application take place between different computing devices. FIG. 4 shows an example of how systems that facilitate systems and methods of the inventive subject matter can be configured. A server 400 is the main computing device responsible for facilitating the functions described in this application. Server 400 can be one or more servers configured to handle episode containers and any of the other functions described in this application as being carried about by a server. A broadcast manager can use a separate computing device 402, but in some embodiments, the broadcast manager can work directly with the server 400.

The broadcast manager can, in some embodiments, use the separate computing device 402 to remotely log in to the server 400 to interact directly with the server, while in other embodiments, the broadcast manager can use the separate computing device 402 to generate requests and receive responses from the server 400 that are instrumental to systems and methods of the inventive subject matter. The server 400 is configured to accept connections from clients 404. Clients 404 that connect to the server 400 are then able to stream episodes that the server 400 has scheduled to broadcast using episode containers of the inventive subject matter. Although FIG. 4 shows these different computing devices communicating wirelessly, it is contemplated that communication can take place over any type of network connection.

Thus, specific systems and methods of creating episode containers and broadcasting content over the Internet have been disclosed. It should be apparent, however, to those skilled in the art that many more modifications besides those already described are possible without departing from the inventive concepts in this application. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A system for broadcasting video with advertisements, comprising:
   a server configured to:
   begin a live broadcast using an episode container comprising a first video-segment;
   receive an advertisement interruption request during the live broadcast, the advertisement interruption request comprising a maximum advertisement duration;
   in response to the advertisement interruption request:
   identify at least one advertisement having an advertisement duration that is less than or equal to the maximum advertisement duration, and
   add at least one advertisement-segment to the episode container, the at least one advertisement-segment having an advertisement-segment duration equal to the maximum advertisement duration;
   switch from the first video-segment to the at least one advertisement-segment to play the at least one advertisement;
   add a second video-segment to the episode container;
   switch from the at least one advertisement-segment to the second video-segment to continue the live broadcast;
   wherein the advertisement interruption request is initiated by a broadcast operator; and
   wherein, upon initiating the advertisement interruption, the broadcast operator defines the maximum advertisement duration.

2. The system of claim 1, wherein the server is further configured to save, for later rebroadcast, the episode container comprising the first video-segment, the second video-segment, and the at least one advertisement-segment.

3. The system of claim 1, wherein, upon rebroadcast, the server is configured to identify a new advertisement to be played in the at least one advertisement-segment.

4. The system of claim 1, wherein the server is further configured to receive the episode container from a broadcast operator.

5. The system of claim 1, wherein the advertisement-segment comprises an advertisement-segment start time that is measured relative to the live broadcast start time.

6. The system of claim 1, wherein the server is further configured to use the episode container to rebroadcast the contents of the episode container.

7. The system of claim 1, wherein the at least one advertisement-segment comprises a first advertisement-segment and a second advertisement-segment.

8. The system of claim 1, wherein the server is further configured to:
   identify a new advertisement having a new advertisement duration that is less than or equal to the advertisement-segment duration;
   insert the new advertisement into the at least one advertisement-segment in the episode container; and
   rebroadcast the episode from the episode container using the new advertisement in the at least one advertisement-segment.

9. A method for broadcasting video with advertisements comprising the steps of:
   beginning a live broadcast using an episode container comprising a first video-segment;
   receiving an advertisement interruption request during the live broadcast, the advertisement interruption request comprising a maximum advertisement duration;
   wherein the advertisement interruption request is initiated by a broadcast operator, and, upon initiating the advertisement interruption, the broadcast operator defines the maximum advertisement duration;

in response to the advertisement interruption request:
identifying at least one advertisement having an advertisement duration that is less than or equal to the maximum advertisement duration, and
adding at least one advertisement-segment to the episode container, the at least one advertisement-segment having an advertisement-segment duration equal to the advertisement duration;

switching from the first video-segment to the at least one advertisement-segment to play the at least one advertisement;

adding a second video-segment to the episode container; and switching from the at least one advertisement-segment to the second video-segment to continue the live broadcast.

10. The method of claim 9, wherein a duration for the at least one advertisement is less than or equal to the advertisement duration.

11. The method of claim 9, further comprising the step of saving, for later rebroadcast, the episode container comprising the first video-segment, the second video-segment, and the at least one advertisement-segment.

12. The method of claim 11, further comprising the step of, upon rebroadcast, identifying a new advertisement to be played in the at last one advertisement-segment.

13. The method of claim 9, further comprising the step of receiving the episode container from a broadcast operator.

14. The method of claim 9, further comprising the step of using the episode container to rebroadcast the contents of the episode container.

15. The method of claim 9, wherein the at least one advertisement-segment comprises a first advertisement-segment and a second advertisement-segment.

16. The method of claim 9, further comprising the steps of:
identifying a new advertisement having a new advertisement duration that is less than or equal to the advertisement slot duration;
inserting the new advertisement into the at least one advertisement-segment in the episode container; and
rebroadcasting the episode from the episode container using the new advertisement in the at least one advertisement-segment.

* * * * *